United States Patent

[11] 3,561,430

| [72] | Inventors | William W. Filler, Jr.<br>77 Bayview Ave., Great Neck, N.Y. 11021;<br>Jorge O. Pantle, J. B. Blanco 624 Ap6,<br>Montevideo, Uruguay |
|---|---|---|
| [21] | Appl. No. | 654,852 |
| [22] | Filed | July 20, 1967 |
| [45] | Patented | Feb. 9, 1971 |

[54] FETAL HEARTBEAT RATE INSTRUMENT FOR MONITORING FETAL DISTRESS
6 Claims, 8 Drawing Figs.

| [52] | U.S. Cl. | 128/2.05 |
|---|---|---|
| [51] | Int. Cl. | A61b 5/02 |
| [50] | Field of Search | 128/2.05, 2.06, 2.1, (Library) |

[56] References Cited

UNITED STATES PATENTS

| 2,831,478 | 4/1958 | Uddenberg et al. | 128/2 |
|---|---|---|---|
| 3,379,901 | 4/1968 | Richards | 128/2.05 |
| 3,030,946 | 4/1962 | Richards | 128/2.06 |
| 3,171,892 | 3/1965 | Partle | 179/1 |
| 3,187,098 | 6/1965 | Farrar et al. | 179/1 |
| 3,256,733 | 6/1966 | Carlin | 73/67.8 |
| 3,283,181 | 11/1966 | Johanson | 310/8.6 |

*Primary Examiner*—William E. Kamm
*Attorney*—Laurence R. Brown

ABSTRACT: Particularly during childbirth it is important to monitor fetal heartbeats to determine distress, and this is accomplished by use of automatic electronic instruments which respond to directional transducers rested upon the outer maternal abdominal wall. An automatic tracking system is provided operating the receiving transducers to follow movements of the fetus, thereby optimizing signal response without manual intervention or attention. The detected fetal heartbeats are processed to provide a visual indication of the heartbeat rate which is made available for every heartbeat period. Further signals are taken representative of the abdominal contractions during labor to correlate on a recorded display the relationship of the fetal heartbeat rate thereby providing information for diagnosing fetal distress.

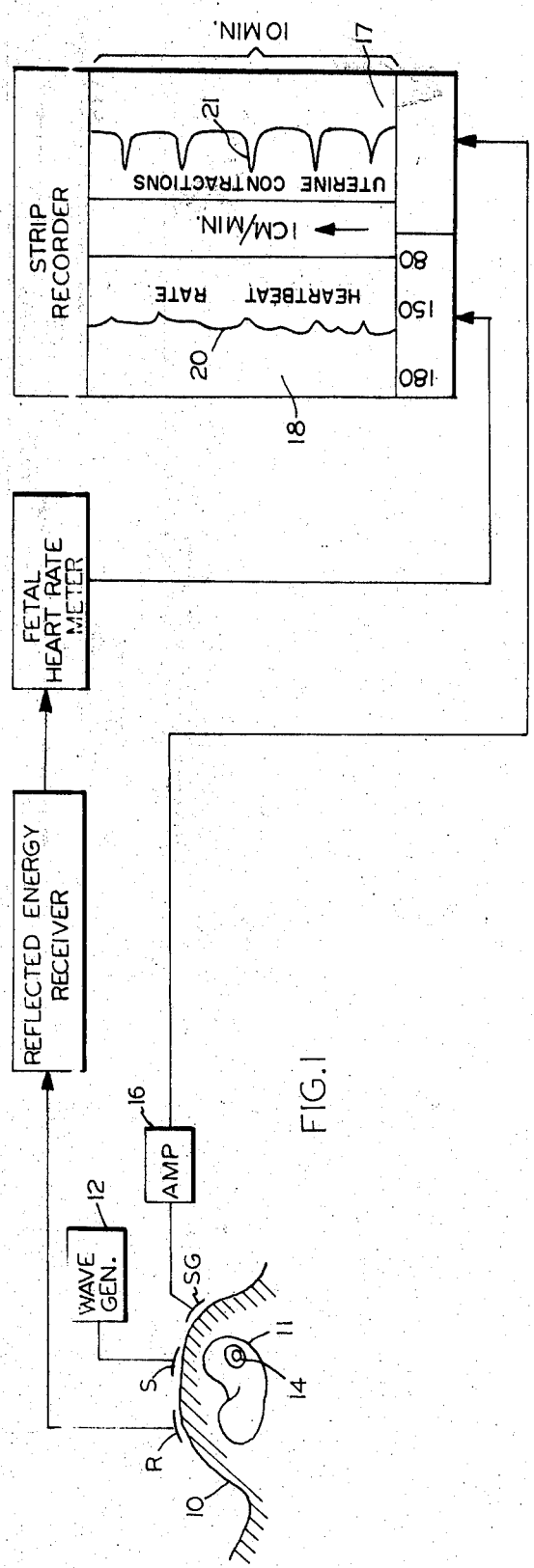
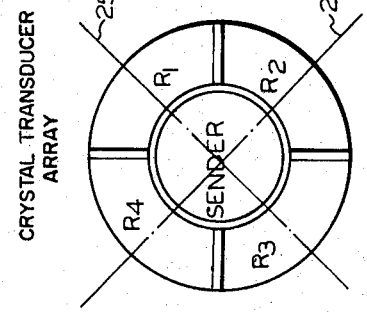

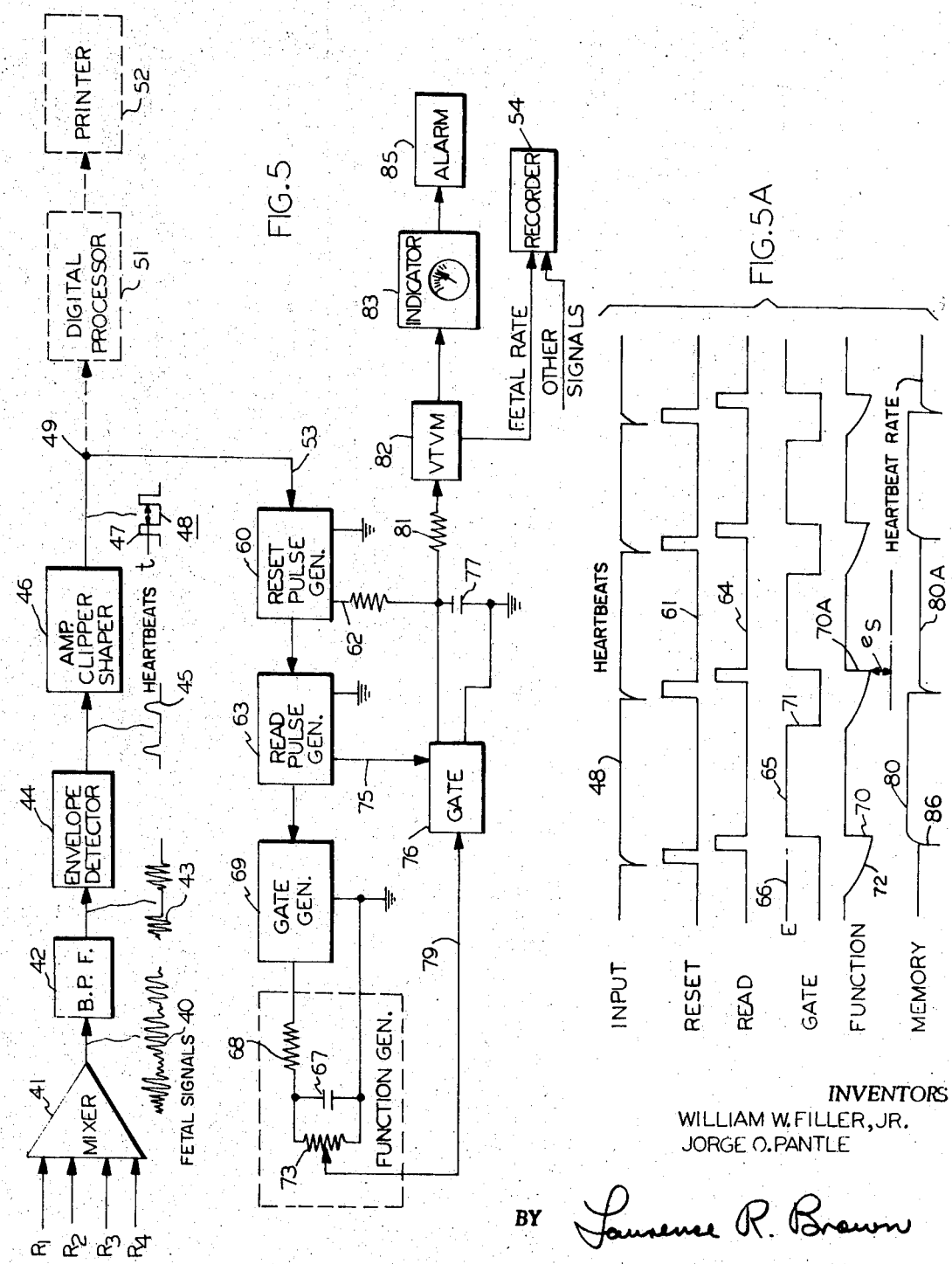

FETAL HEARTBEAT RATE INSTRUMENT FOR MONITORING FETAL DISTRESS

This invention relates to electronic instrumentation for diagnosing heartbeats, and more particularly, it relates to instruments for detecting and displaying correlated reactions in both the fetus and mother to provide information for diagnosing fetal distress.

Although instrumentation for detecting and analyzing heartbeats has been developed heretofore, there has been no satisfactory equipment available for indicating fetal distress when correlated with the reactions of a mother during labor.

Furthermore, even in the detection of a fetal heartbeat, there has been significant unreliability in prior art approaches. When a microphone is used, for example, the fetal heartbeat may be attenuated by sound barrier such as abdominal fat, or may be masked by extraneous noises from the mother's pulse, muscular or organic reactions or other extraneous noises, particularly when the mother is in labor.

Also, there has been no adequate instrumentation suitable for application to recent developments in the diagnosis of fetal distress as a function of conditions of the mother, as reported, for example, in the following papers:

1. Caldeyro, Barcia R., Filler W., Jr., et al. "Effects of Uterine C0ntractractions on the Heart Rate of the Human Fetus." Fourth International Conference on Medical Electronics, New York, 1961.
2. Caldeyro, Barcia R., Filler W., Jr., et al. "Effects of Abnormal Uterine Contractions on a Human Fetus." Mod. Probl. Pediat. 8: 267—296(Karger, Basel/New York, 1963).
3. Caldeyro, Barcia, et al. "Evaluation of Fetal Condition by Means of Fetal Heart Rate. In: Effects of Labour on the Fetus and Newborn." R. Caldeyro, Barcia C. Mendez, Baner and G.S. Dawes, Editors, Pergamon Press. Oxford, 1967.
4. Brady, J., James, L.S., Baker, M.A., "Heart Rate Changes in the Fetus and Newborn Infant During Labor, Delivery and the Immediate Neonatal Period." Am. J. Obst. & Gynec. 84: 1—12, 1962.
5. Hon, E.C. "The Diagnosis of Fetal Distress." Clin. Obst. Gyn. 3: 860, 1960.

Even the use of sonic principles or reflected electronic energy, which permits use of directional transducers to pick up energy reflected from the fetal heart, has been unsatisfactory since the fetus moves about particularly during labor and signals may be lost or diminished unless manually directed at all times during the monitoring period. Thus, automatic continuous monitoring has not been possible heretofore.

Some prior art instrumentation required transducers that must be inserted within the body of the mother of or fetus to be effective, thereby becoming particularly useless during periods of fetal movement of or fetal distress and providing danger to the survival of the fetus.

Accordingly, it is a general object of this invention to provide improved electronic instrumentation for diagnosing fetal distress.

Another object of the invention is to provide automatic fetal heartbeat monitors that may be used during labor without a manipulation, directing, or insertion.

A further object of the invention is to provide visual fetal heartbeat indications showing the heartbeat rate and additionally being adapted to display corresponding physical reactions of the mother, particularly during labor.

A still further object of the invention is to provide reliable fetal heartbeat indications showing any changes in heartbeat rate from one heartbeat to the next.

These and further objects and features of advantage are described in detail in the following specification which refers to the accompanying drawings, wherein:

FIG. 1 is a block diagram of the general system afforded by this invention;

FIGS. 2 and 2A are sketches of a typical array of directional crystal transducers arranged for array on a maternal external abdomen surface for sending and receiving ultrasonic energy;

Figure 4:
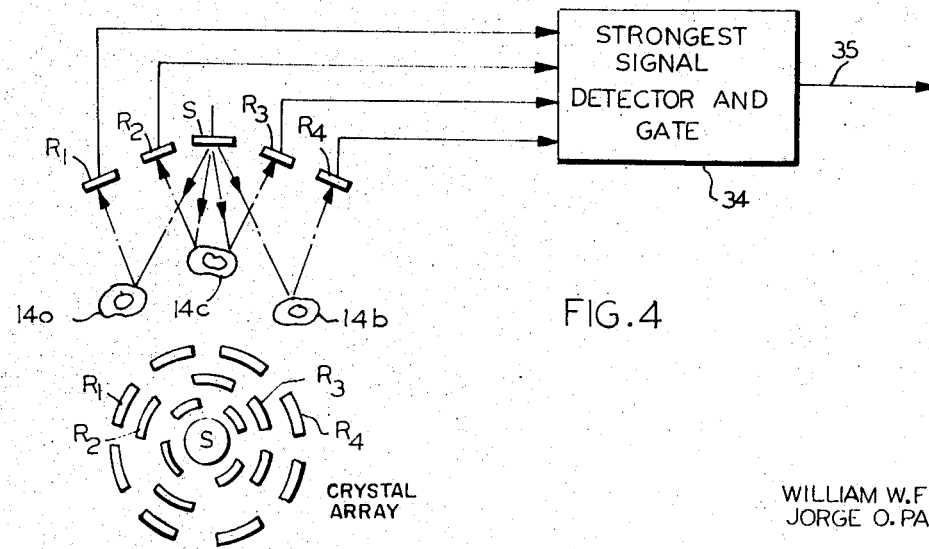
Figure 4A:
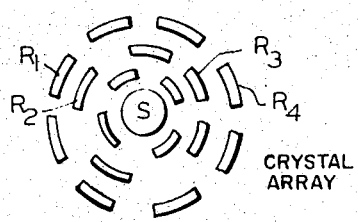

FIGS. 4 and 4A shown diagrammatically an alternate tracking arrangement using stationary transducers; and FIGS. 5 and 5A are respectively block and waveform diagrams illustrating a fetal heart rate detection system afforded by this invention.

In FIG. 1 is s displayed a sketch of a maternal abdomen 10 with a fetus 11 therein. Thus, in accordance with this invention, all the instrument transducers R, S and SG which, for example, may include piezoelectric crystals as conventionally used for sonic vibration generation and detection, are located on the external surface of the maternal abdomen. Accordingly, electronic waves such as radar-type pulses or ultrasonic vibrations are generated in wave generator 12 and directed inwardly toward a fetal heart 14 by a directional sending transducer S. By the same token, energy reflected from the fetal heart is detected by a directional receiving transducer R, which thereby provides a signal from which fetal heartbeat signals may be removed and processed. For example, if the system is a well-known sonic arrangement with a Doppler effect receiver, variations of the reflected signal frequency at transducer R will provide signals from the moving fetal heart as it beats because of a change in distance of reflected signal travel. This type of system is preferred since the signals are presented as physical wavefronts termed ultrasonic energy and have never been known to damage the tissue of the mother or fetus at the magnitudes necessary to produce reliable heartbeat monitoring. Furthermore, these signals penetrate abdominal muscle and fat with little attenuation and through use of directional crystal transducers resonated or tuned to the ultrasonic energy period (of up to 2 megacylces for example) the signals returned may be concentrated at or focused on the fetal heartbeat signals, thus avoiding the disadvantages of a sound microphone and its many extraneous noises. The resonant crystal of conventional sonic, probes exclude other energy than that of the sonic generator frequency, and their sharp directivity assures strong signals from the region under survey. Since sonic techniques are conventional and equipment of different forms useful herein is readily available from many sources, the wave generator 12 and reflected energy receiver 15 need not be described in detail.

A further transducer SG which may be a strain gage, for example, on the maternal exterior abdomen surface is used with an appropriate amplifier 16 to monitor the condition of the mother, particularly during labor, where contractions are sensed and reproduced on strip recorder chart 17. This permits a correlation with the fetal heartbeat signals on the adjacent strip chart 18 which is run on the same time base to display not the fetal heartbeat signal but the heartbeat rate, which is detected at the heart rate meter 19, hereinafter described in more detail. Thus, the relationship between changes in heartbeat rate as shown by impulses 20, etc., may be studied and compared with uterine contractions, evidenced by impulses 21, etc., to determine whether the condition of the fetus is abnormal. Thus, the present instrument is useful during labor and childbirth to continuously and automatically monitor the fetus condition without requiring any insertion of needles, probes or instruments into either the fetus or mother, and as hereinafter described not requiring manual attention and giving instantaneous signals at all times representative of current and historic conditions so that abnormalities may be easily recognized by visual inspection of the charts or other indicators such as meters.

Figure 3:
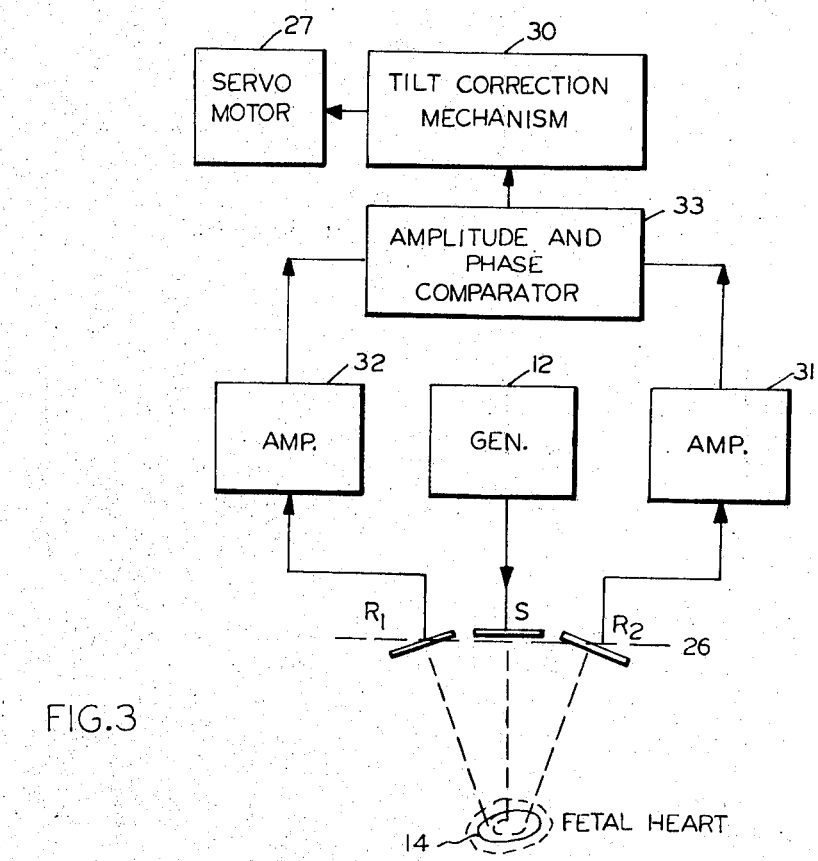
FIG. 3 is a block diagram of a movable transducer tracking arrangement afforded by this invention to follow changes in fetus position.

As e seen from FIGS. 2 and 3, an array of transducer receiving crystals $R_1$-$R_4$ is made about a central sending crystal so that transducers $R_1$ and $R_3$ may be revolved about an axis 25 and transducers $R_2$ and $R_4$ may be revolved about a normal axis 26, for example by mounting in a holder as shown in FIG. 2A where each axis is controlled in position by a separate DC servomotor positioning device 27, for example.

Thus, as depicted in FIG. 3, the transducer may be pivoted to orient directional transducers $R_3$ and $R_4$ toward a fetal heart 14, which may lie in the plane of the drawing or on either side, and by means of the tilt correction mechanism 30 any change in location of the fetal heart during operation will be following automatically. Accordingly, the heartbeat signals from separate s crystal transducers $R_3$ and $R_4$ are amplified in their respective amplifiers 31 and 32, which may contain filters as later described to enhance only the heartbeat signals if desired. By differentially comparing these signals in a conventional bridge or other electronic servophase and amplitude comparator circuit section 33, an error signal may be obtained to run the servomotor 27 in the proper direction (readily done with a DC motor and error signal) until the signal condition is optimized by equal strong amplitudes at each of the receiver crystals $R_3$ and $R_4$. Engineering design of this simple servocontrol system is readily apparent to those skilled in the art using conventional published techniques. Separate systems as shown in FIG. 3 are used to control the crystals aligned on the different axes 25 and 26 for a full three dimensional signal source following capability when the the outputs of all four crystal transducers $R_1$-$r_4$ are combined as the fetal heartbeat signal. It is readily seen that this novel automatic control feature for heartbeat monitoring instruments for the first time permits a fetal heartbeat to be monitored during labor and childbirth as the fetus moves about, without requiring a skilled technician to hold and direct a probe continuously. Also, in the latter mode of operation a few critical or weakened heartbeats could be missed which would signal fetal distress and endanger the fetus, whereas this automatic tracking feature permits continual reliable reproduction of signals throughout long periods of labor and childbirth for the first time.

Alternative modes of receiving signals during motion of the fetus may be employed such as use of an arrangement or pattern of stationary crystals shown in FIGS. 4 and 4A, where the strongest signals are selected and passed to the output signal lead 35 by means of a detector and gating circuit 34. It is preferable to select the best signals by orientation or logic procedures rather than to mix all signals from a group of transducers $r_1$-$R_4$ because of the directional characteristic of the transducers indicated by the angle of received signal paths 37, etc., and the possiblity of picking up noise signals such as arterial activity in the placenta which is a function of the maternal heartbeat, which may be confused with the fetal heartbeat.

The ability to determine fetal heartbeat rate is afforded by this invention and is illustrated by means of the embodiment of FIG. 5, which not only affords a historical indication of the fetal heartbeat rate but also permits monitoring of rate changes from one heartbeat to the next, so that individual changes can be monitored quickly to permit rapid corrective action whenever the fetus is found to be in distress.

As seen in waveform 40, which is a composite signal received by mixing four signals received from crystals $R_1$-$R_4$ at a mixer 41, a predominate fetal heartbeat period is observable. These are representative of doppler-type signals received from sonic energy reflected from the fetal heart. By employing a low frequency band pass filter 42 other high frequency noise signals are removed as indicated by waveform 43, from which the envelope may be detached at detector 44 to present a series of pulses 45 suitable for shaping. These are amplified and clipped, in shaping circuits 46 and a standardized waveform pulse 47 is produced by a Schmidt trigger circuit or one-shot multivibrator. Thus, wave train 48 is produced at signal output lead 49 to contain processed signals which present the fetal heartbeats in clean pulsed signal form as represented by the timing $t$ between two adjacent pulses.

For use in analyzing the fetus, the rate may be reproduced in various manners, but both the historical rates together with instantaneous or current rates existing between each two adjacent heartbeats is desirable information for aiding a diagnosis of fetal distress. While any suitable electron digital processor 51 may measure the timing and derive a printed or displayed signal at printer 52 for each successive heartbeat period or an average of a few, the system processing signals from lead 53 is a preferred embodiment adapted for use in a simple and inexpensive instrument of the type shown in FIG. 1 and employing a dual track recorder 54.

For analysis of operation of this portion of the fetal heartbeat rate metering equipment, the block diagram of FIG. 5 will be discussed concurrently with the waveform diagrams of FIG. 5A. Thus, the input signals 48 may be used at reset pulse one-shot multivibrator or similar electronic pulse generator 60 to produce accurately timed reset pulses for each fetal heartbeat in a periodically occuring train of pulses 61, as presented at output lead 62.

The trailing edge of the reset pulse are used to trigger read pulse generator 63 and to form train of "Read" pulses 64. The trailing edge of each read pulse is used to provide a series of "gate" pulses 65 in gate generator 69, which can be a one-shot multivibrator. The gate generator 69 provides a known stable voltage level 66 for a long enough direct duration, say half of a normal fetal heartbeat period, to charge capacitor 67 through a relatively low ohm resistance 68 during period 70 and to establish a known instant of discharge 71 through which the capacitor discharges on a known path 72 through resistor 73 over a variable time period terminated by presence of the next fetal heartbeat and accordingly a new charge period 70A of the capacitor 67.

Read pulses 64 appearing at lead 75 are used to gate through gating circuit 76 a voltage level into a relatively small capacity capacitor 77 as referenced to some standard voltage level such as ground. Thus, a signal readout level $e_s$ is present at lead 79 and is sampled into capacitor 67 to provide a stable voltage level 80, etc. at least over a period as long as the fetal heartbeat period. By using a high impedance resistor 81 and a vacuum tube (or transistorized) high impedance voltmeter 82, a meter reading can be provided on indicator 83 which displays the fetal heartbeat period, and is thus representative of the rate of heartbeats giving an indication for every heartbeat period. This output voltage signal is used either independently or solely at recorder 54 in the system of FIG. 1. Additionally, an automatic alarm circuit 85 established by conventional relay meters may audibly signal any abnormalities when the rate is outside present limits.

As seen by discharge strokes 86, the memory voltage of capacitor 77 is fully discharged by each reset pulse at lead 62 as the next fetal heartbeat is sensed. Then almost immediately a new level is set by the read pulse at lead 75 gating in a new signal level $e_s$. In this operation the time along the capacitor 67 discharge curb 72 (FIG. 5A) at which the read pulse occurs is changed into a different voltage level which can be readily monitored on meter indicator 83 or recorder 54. Thus, if any significant variation of fetal heartbeat rate occurs even between two successive heartbeat periods 80 and 80A, it may be monitored and recorded.

It is evident throughout the foregoing specification that novel and improved instrumentation is afforded for diagnosing fetal distress through monitoring the fetal heartbeat rate and comparing this with physical reactions of the mother particularly during labor. Accordingly, those features of novelty believed descriptive of the spirit and nature of the invention are set forth with particularity in the appended claims.

We claim:

1. Instrumentation for detecting fetal heart signals comprising in combination, electromagnetic generating means adapted for directing periodic energy internally from the surface of a maternal abdomen and adapted to be secured upon the external abdomen surface to direct energy toward a fetal heart at a various positions within the womb, detector means adapted to be secured on the external maternal abdomen surface at a single location and constructed for detecting a component of said energy reflected back from physical changes representing a pulsating fetal heart at various locations within the womb, and means processing said detected component of energy to produce a visual indication of the fetal heartbeat rate comprising means independently detecting changes in dimension of abdominal external surfaces and recording means displaying signals on a coordinated time base comprising at least the fetal heartbeat rate and the abdominal surface changes.

2. Instrumentation as defined in claim 1, wherein said detecting means adapted to be on the abdomen surface comprises a plurality of electromechanical transducers each selectively responsive to reflected signals from a narrow directional sector and positioned to encompass a pattern generally corresponding to the shape of a womb and including means for deriving from the transducers a signal indicating the direction of movement of a detected heartbeat.

3. Instrumentation for detecting fetal heart signals comprising in combination, electromagnetic generating means adapted for directing periodic energy internally from the surface of a maternal abdomen and adapted to be secured upon the external abdomen surface to direct energy toward a fetal heart at a various positions within the womb, detector means adapted to be secured on the external maternal abdomen surface at a single location and constructed for detecting a component of said energy reflected back from physical changes representing a pulsating fetal heart at various locations within the womb, means processing said detected component of energy to produce a visual indication of the fetal heartbeat rate, means of deriving an error signal from at least two different ones of said transducers, and means responsive to said error signal for changing the direction of the transducers to follow changes in location of a signal from a heartbeat detected by said transducers.

4. Instrumentation for detecting fetal heart signals comprising in combination, electromagnetic generating means adapted for directing periodic energy internally from the surface of a maternal abdomen and adapted to be secured upon the external abdomen surface to direct energy toward a fetal heart at various positions within the womb, detector means adapted to be secured on the external maternal abdomen surface at a single location and constructed for detecting a component of said energy reflected back from physical changes representing a pulsating fetal heart at various locations within the womb, means processing said detected component of energy to produce a visual indication of the fetal heartbeat rate wherein the energy signals produce a physical wave front and said detecting means comprises two pairs of directional electromechanical transducers resonant at the periodic frequency of said energy and oriented respectively on different axes of rotation, and means rotating each set of transducers automatically as a function of differential signal component amplitudes received from respective ones of the transducers in each pair to direct the transducers in an orientation maximizing the received signal component.

5. Electronic instrumentation for detecting fetal heartbeats, comprising in combination, a sending transducer adapted to pass period energy waves internally from a fixed position outside a maternal abdomen to detect fetal heartbeats, an electronic generator producing signals energizing said transducer, a set of directional receiving transducers adapted to be oriented to pick up a component of said energy reflected back from the fetal heartbeat, a tracking system operable with said receiving transducers adapted to follow movements of the heartbeat location and produce an optimized signal at the receiving transducers, and means reproducing in visible form a signal representative of the fetal heartbeat rate.

6. Electronic instrumentation for detecting fetal heartbeats comprising in combination, a sending transducer adapted to direct periodic energy waves internally from the outer surface of a maternal abdomen to the vicinity of a fetus at a fetal heart location anywhere within the womb, at least one directional receiving transducer adapted to be placed at a fixed location upon the outer surface of the maternal abdomen with characteristics causing it to pick up a component of said energy reflected back from the fetus at any location within the womb, including detector means adapted to be located in a fixed location and adapted to detect physical changes of surface dimensions of a maternal abdomen representative of contractions during labor, and means displaying the latter detected changes visually on a correlated time scale with the corresponding indication of fetal heartbeat rate.